JOHN P. HUMASON.

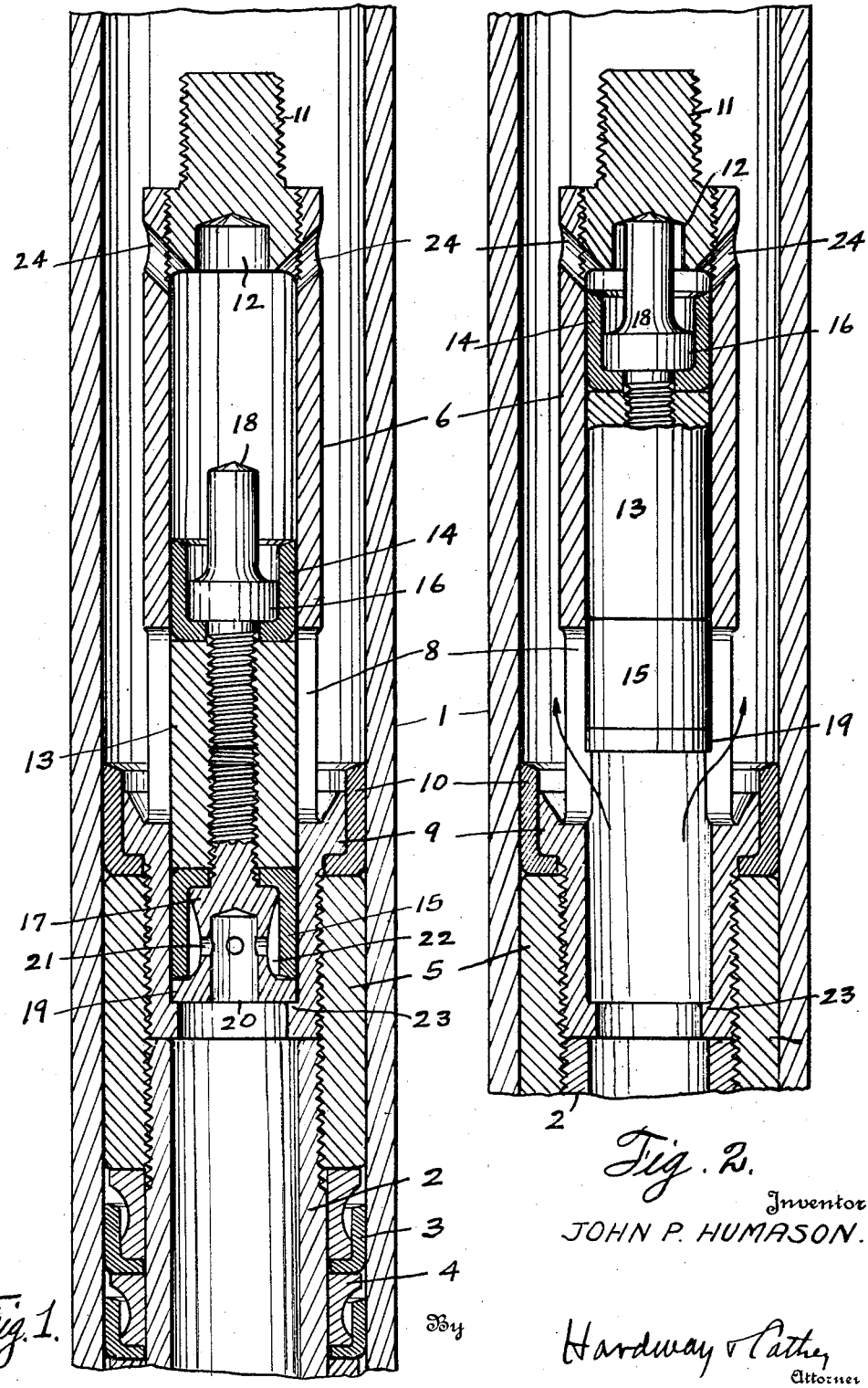

Patented Dec. 2, 1930

1,783,291

UNITED STATES PATENT OFFICE

JOHN P. HUMASON, OF HOUSTON, TEXAS

VALVE MECHANISM

Application filed April 28, 1928. Serial No. 273,651.

This invention relates to new and useful improvements in a valve mechanism.

One object of the invention is to provide a mechanism of the character described specially designed for use as a traveling valve in pumps, particularly the type of pumps commonly used for pumping fluid, such as oil, from wells.

Another object of the invention is to provide, in a traveling valve, such as now employed, a novel type of structure designed to take the place of the ball and seat now commonly employed for controlling the flow of fluid upwardly through the traveling valve structure.

A further feature of the invention is to provide, in a traveling valve structure a plunger type valve which will be very efficient in controlling the fluid, which will not be so liable to sand up as the ball and seat now commonly used, and which will not readily wear and permit back leakage.

With the above and other objects in view this invention has particular relation to certain novel features of construction, operation and arrangement of parts an example of which is given in this specification and illustrated in the accompanying drawings, wherein:—

Figure 1 shows a fragmentary vertical sectional view of a traveling valve mechanism illustrating the invention and showing the plunger valve closed.

Figure 2 shows a vertical sectional view thereof, showing said plunger valve open.

Figures 3, 4:
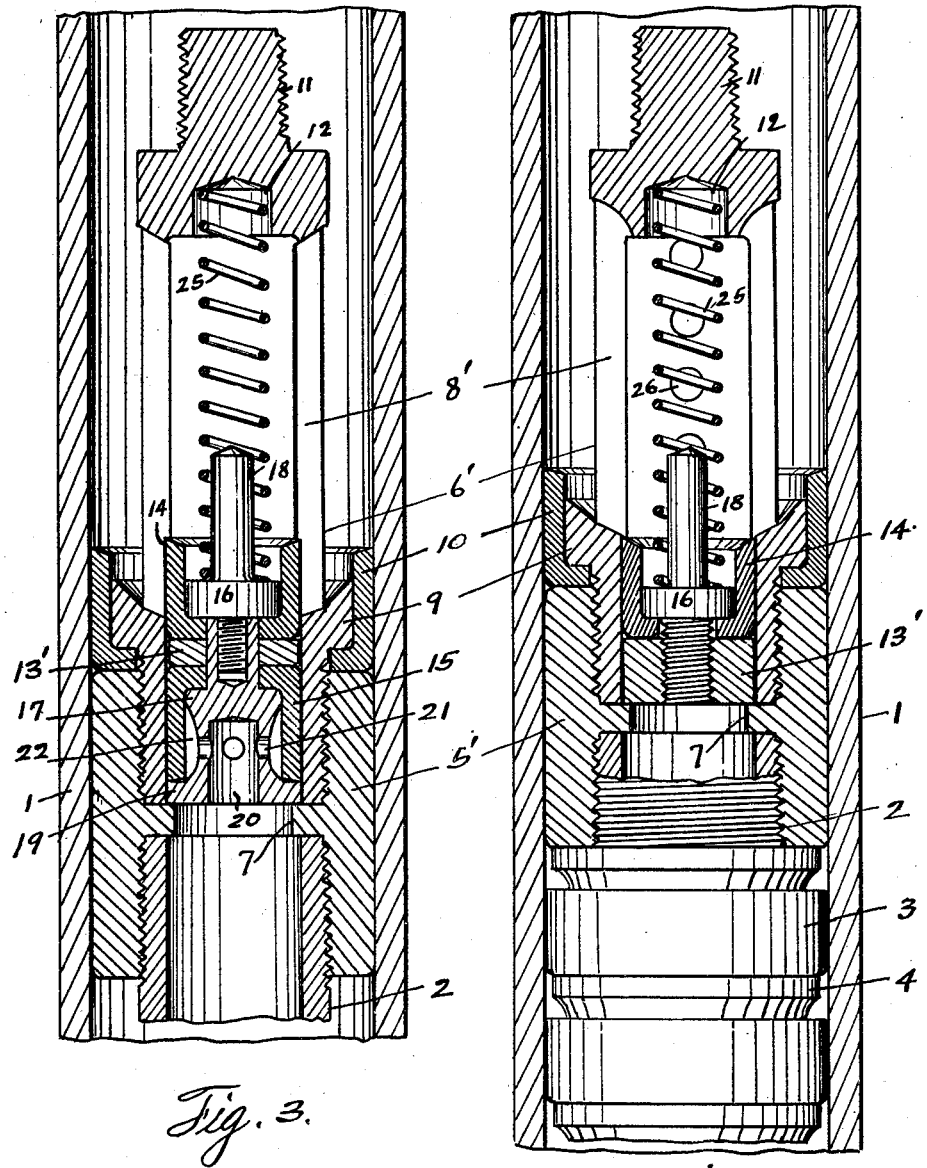
Figure 3 shows a vertical sectional view of a modified form thereof.
Figure 4 shows a vertical sectional view of another modification thereof.

Referring now more particularly to the drawings, wherein like numerals of reference designate similar parts in each of the figures the numeral 1 designates the working barrel of the pump and the numeral 2 designates the tubular body of any conventional type of traveling valve structure, having the usual cup rings 3, spaced apart by the spacer rings 4. Screwed onto the upper end of the body 2 there is a coupling 5, Figures 1 and 2 or 5', Figures 3 and 4.

Screwed into the upper end of the respective couplings 5, 5' are the cages 6, and 6'. The lower end of the cage 6 abuts the upper end of the body 2 and the lower end of the cage 6' abuts the inwardly extending flange 7 in the coupling 5'. The cages 5, 5' are substantially tubular in form and have the side slots 8, 8' respectively, and beneath these slots have the enlarged external annular ribs 9, whose inner sides are flared upwardly, and which clamp the cup rings 10 between them and the adjacent ends of the couplings 5, 5'. The upper ends of the cages 6, 6' have the reduced, outwardly threaded pins 11 provided for the attachment of a pump sucker rod thereto. In the form shown in Figures 1 and 2 these pins are screwed into the upper end of the cage and are thus removable. The upper end of the cage, of each form has an internal downwardly facing socket 12.

In the form shown in Figure 1 there is a plunger like valve comprising the tubular body 13, the upper and lower end cup rings 14, 15, held in place by the respective nipples 16, 17 which are screwed into the upper and lower ends, respectively of the body 13 and clamp said cup rings 14 and 15 in place. The nipple 16 has an upward extension 18 and the nipple 17 has a lower end flange 19 against which the open end of the cup ring 15 abuts. This nipple 17 also has a lower end socket 20 with ports 21 leading from it into a chamber 22 formed by concaving the outer side of the lower end of said nipple 17.

The plunger valve of the type shown in Figure 3 is substantially similar to that shown in Figure 1 except that the body 13' is shorter and the nipple 16 has a threaded connection with the nipple 17.

In the form shown in Figure 4 the plunger valve embodies only the body 13' and the upper cup ring 14 clamped onto the upper end thereof by the nipple 16. In each form the plunger valve fits closely in its cage.

In the form shown in Figures 1 and 2 the lower end of the plunger valve abuts the internal annular seat 23, of the cage 6 and in this position the slots 8 are closed by said valve, and the cage, of this form has the ports 24, at the upper end thereof. Upon down stroke of the traveling valve structure the fluid beneath the valve will pass into the chamber 22 and hold the cup ring 15 closely against the cage walls to prevent leakage and the pressure of the fluid will lift the plunger valve and uncover the slots 8 to permit the fluid to pass above the traveling valve. The projection 18, of this form will enter the socket 12, above, and stop the upward movement of the plunger valve before it closes the ports 24. Upon beginning of up stroke of the traveling valve the fluid will pass through the slots 8 and wash out any sand that may have collected in the bottom part of the cage, and as the traveling valve moves on up the fluid will enter through the ports 24 above the cup-ring 14 and force the plunger valve downwardly to close the slots 8. The pin 11, of the cage 6 is removable to permit the assembly of the plunger valve with said cage.

In the type of traveling valve shown in Figures 3 and 4 upon down stroke of the valve the plunger valve will be lifted to uncover the lower ends of the slots 8' to permit the fluid to pass upwardly therethrough and upon upstroke thereof the fluid will engage the cup ring 14 and force the plunger valve downwardly to close said slots 8'. This downward movement will be assisted by the coil spring 25, whose upper end is seated in the corresponding socket 12 and whose lower end rests on the upper nipple 15. In this type of the structure the downward movement of the plunger valve is limited by the inwardly extending rib 7. The slots 8' extend up to the upper end of the cage 6' so that the ports 24, of the type shown in Figure 1, are not necessary. As a substitute for the slots 8', a vertical row of the perforations, as 26 may be provided, if desired. In the forms shown in Figures 3 and 4 upon the beginning of the up stroke the fluid will pass through the lower ends of the slots 8' and wash out the sand that may collect in the lower part of the cage, before the plunger valve has seated, as in the form shown in Figure 1.

While I have shown what I now consider the preferred types of the invention it is obvious that mechanical changes may be made therein and equivalents substituted for the parts shown and I reserve the right to make such changes and substitutions within the scope of the appended claims.

What I claim is:—

1. A traveling valve structure including a valve body, a coupling attached to the upper end thereof, a tubular cage whose lower end is attached to said coupling, said cage having side openings, an annular rib around said cage beneath said openings whose upper side is upwardly flared, an upwardly opening cup ring surrounding said rib and clamped between it and the upper end of said coupling, a plunger like valve slidable in said cage and adapted to open and close said openings.

2. A traveling valve structure including a valve body, a coupling attached to the upper end thereof, a tubular cage whose lower end is screwed to said coupling, said cage having side openings, an annular rib around said cage beneath said openings whose upper side is upwardly flared, an upwardly opening cup ring surrounding said rib and clamped between it and the upper end of said coupling, a plunger like valve slidable in said cage and adapted to open and close said openings, said slidable valve comprising a body and upwardly and downwardly turned cup rings thereon.

3. A traveling valve structure including a valve body, a coupling attached to the upper end thereof, a tubular cage whose lower end is detachably secured to said coupling, said cage having side openings, an annular rib around said cage beneath said openings whose upper side is upwardly flared, an upwardly opening cup ring surrounding said rib and clamped between it and the upper end of said coupling, a plunger like valve slidable in said cage and adapted to open and close said openings, the free margin of said cup ring extending above the lower ends of said side openings.

In testimony whereof I have signed my name to this specification.

JOHN P. HUMASON.